(12) United States Patent
Stiller

(10) Patent No.: US 6,523,845 B2
(45) Date of Patent: Feb. 25, 2003

(54) METHOD OF FILLING A PRESSURIZED MEDIUM CHAMBER OF A LEVEL CONTROL SYSTEM FROM A PRESSURIZED MEDIUM STORE

(75) Inventor: Alexander Stiller, Garbsen (DE)

(73) Assignee: Continental Aktiengesellschaft, Hannover (DE)

( * ) Notice: Subject to any disclaimer, the term of this patent is extended or adjusted under 35 U.S.C. 154(b) by 98 days.

(21) Appl. No.: 09/780,374

(22) Filed: Feb. 12, 2001

(65) Prior Publication Data

US 2001/0017449 A1 Aug. 30, 2001

(30) Foreign Application Priority Data

Feb. 11, 2000 (DE) .......................................... 100 06 024

(51) Int. Cl.⁷ ............................................... B60G 11/30
(52) U.S. Cl. .............................. 280/124.16; 267/64.11; 267/64.28; 280/124.157
(58) Field of Search ..................... 280/124.16, 124.157, 280/5.5, 5.504, 5.514, 5.515, FOR 159, FOR 168, FOR 171; 267/218, 113, 64.11, 62.45, 64.28

(56) References Cited

U.S. PATENT DOCUMENTS

| | | | | |
|---|---|---|---|---|
| 5,484,162 A | * | 1/1996 | Kanoh et al. | .......... 280/124.157 |
| 5,678,846 A | * | 10/1997 | Davis | .................. 280/124.157 |
| 5,794,924 A | * | 8/1998 | Stolpp | .................... 280/124.16 |

FOREIGN PATENT DOCUMENTS

| | | | | |
|---|---|---|---|---|
| DE | 1141197 | * | 12/1962 | ........ 280/FOR 168 |
| DE | 3339080 | | 5/1985 | |

* cited by examiner

*Primary Examiner*—Eric Culbreth
(74) *Attorney, Agent, or Firm*—Walter Ottesen

(57) ABSTRACT

The invention is directed to a method of filling a pressurized medium chamber of a level control system which includes a pressurized medium store and a compressor. The pressurized medium chamber is filled from the pressurized medium store over a time span during which the pressurized medium difference between the pressurized medium store and the pressurized medium chamber exceeds a threshold value. When the pressurized medium difference between the pressurized medium store and the pressurized medium chamber reaches the threshold value, a further filling of the pressurized medium chamber is necessary and takes place by means of the compressor of the level control system.

9 Claims, 2 Drawing Sheets

METHOD OF FILLING A PRESSURIZED MEDIUM CHAMBER OF A LEVEL CONTROL SYSTEM FROM A PRESSURIZED MEDIUM STORE

FIELD OF THE INVENTION

The invention relates to a method for filling a pressurized medium chamber of a level control system for a motor vehicle by which a vehicle body is suspended relative to at least one vehicle axle. The level control system includes: a pressurized medium store; at least one pressurized medium chamber which is operatively connected from time to time to the pressurized medium store so that pressurized medium from the pressurized medium store is transferrable into the pressurized medium chamber; and, a compressor which is operatively connected from time to time to the pressurized medium store or to the pressurized medium chamber in such a manner that pressurized medium is transferrable into the pressurized medium store or into the pressurized medium chamber by means of the compressor.

BACKGROUND OF THE INVENTION

A level control system, which includes the pressurized medium chambers and a pressurized medium store, is known in the form of an air spring system as described, for example, in German patent publication 3,339,080. In this system, the pressurized medium can be transferred from the pressurized medium store into the pressurized medium chambers. When one of the pressurized medium chambers of the level control system is to be filled, then this pressurized medium chamber is connected to the pressurized medium store and, with the aid of a compressor, pressurized air is transferred from the pressurized medium store into the pressurized medium chamber. An advantage of the level control system disclosed in German patent publication 3,339,080 is that, because of the increased pressure in the pressurized medium store, the power consumed by the compressor is lower than when this pressurized air is transferred from the atmosphere into the pressurized medium chamber.

It can, however, be stated that the compressor runs during the entire filling operation of a pressurized medium chamber in the level control system disclosed in the German patent publication 3,339,080. This generates noise which is especially disturbing when the vehicle is at standstill and when there is an overall low noise level.

SUMMARY OF THE INVENTION

It is an object of the invention to provide a method for filling a pressurized medium chamber of a level control system for a motor vehicle wherein the pressurized medium chamber can be filled from a pressurized medium store as long as possible without actuating the compressor.

The method of the invention is for filling a pressurized medium chamber of a level control system for a motor vehicle by which a vehicle body is suspended relative to at least one axle of the vehicle, the level control system including: a pressurized medium store; at least one pressurized medium chamber which is operatively connected from time to time to the pressurized medium store so that pressurized medium from the pressurized medium store is transferrable into the pressurized medium chamber; and, a compressor which is operatively connected from time to time to the pressurized medium store or to the pressurized medium chamber in such a manner that pressurized medium is transferrable into the pressurized medium store or into the pressurized medium chamber by means of the compressor; the method includes the steps of: in advance of filling the pressurized medium chamber with the pressurized medium, determining the pressure in the pressurized medium store and the pressure in the pressurized medium chamber and the pressure difference between the pressurized medium store and the pressurized medium chamber; and, during the filling operation, transferring pressurized medium at least from the pressurized medium store to the pressurized medium chamber during a time span during which the pressure difference between the pressurized medium store and the pressurized medium chamber exceeds a threshold value; transferring pressurized medium into the pressurized medium chamber utilizing the compressor when the pressurized medium pressure difference between the pressurized medium store and the pressurized medium chamber drops below the threshold value and a further filling of the pressurized medium chamber is necessary.

For the threshold value, a pressure is preferably pregiven which is between 0 bar and 1 bar. The determination of the pressure in the pressurized medium store and in the pressurized medium chamber takes place preferably with the aid of a single pressure sensor of the pressure control system. How this is done will be explained in detail in connection with the drawings hereinafter.

The advantage achieved by the invention is especially seen in that a filling of a pressurized medium chamber of a level control system takes place essentially with the aid of the pressure store and the compressor is only utilized when the pressure difference between the pressurized medium store and the pressurized medium chamber reaches a threshold value. With the method of the invention, the time span is optimized during which the pressurized medium is transferred from the pressurized medium store into the pressurized medium chamber. With the invention, a substantially noiseless filling of the pressurized medium chamber from the pressurized medium store is therefore possible which is especially advantageous during standstill of the motor vehicle or when traveling at a low vehicle speed. The threshold value is preferably so pregiven that the pressure in the pressurized medium store is slightly greater than the pressure in the pressurized medium chamber when the threshold value is reached so that a sufficiently large airmass flow of the pressurized medium is transferred from the pressurized medium store into the pressurized medium chamber when the threshold value is reached. A further advantage of the invention is that the level control system has a simple configuration and no additional costs are incurred compared to a conventional level control system.

According to another feature of the invention, the time span during which the pressure difference between the pressurized medium store and the pressurized medium chamber exceeds a threshold value is determined from a characteristic line which reflects the time-dependent course of the pressure difference. An advantage of this feature is that no pressure measurement is necessary during a filling operation in order to determine the actual pressure difference. A further advantage of this embodiment is that a determination of the time span from a characteristic line is possible in a simple manner. However, and alternatively, a computation of the time span with the aid of a mathematical model is possible.

According to another feature of the invention, the pressure in the pressurized medium store is measured directly after a change of the pressure in the pressurized medium store (that is, after each filling operation of the pressurized medium chamber by means of the pressurized medium store and after a filling operation of the pressurized medium store by means of the compressor). The measured pressure is stored in the control unit of the level control system and is available for the next filling operation to compute the starting pressure difference. The advantage of this embodiment is that only the pressure in the pressurized medium chamber has to be measured directly in advance of a filling operation and therefore no additional valve switchings for the stored pressure measurement are necessary directly in advance of a filling operation.

According to another feature of the invention, the pressure in the pressurized medium store is measured at regular intervals. Preferably, intervals for pressure measurement are selected which lie between 5 minutes and 20 minutes. The measured pressure is stored in the control unit of the level control system so that only the pressure in the pressurized medium chamber needs to be measured directly in advance of a filling operation. The advantage of this embodiment is that, with regular pressure measurements, pressure fluctuations in the pressurized medium store because of temperature fluctuations or leakage of the pressurized medium store are recognized and can be eliminated. Accordingly, an actual pressure of the pressurized medium store is always the basis in a filling operation.

According to another feature of the invention, the vehicle body is suspended relative to at least one vehicle axle by two pressure chambers and, for a common filling of the pressurized medium chambers, the pressure in each pressurized medium chamber is measured in advance of the fill operation and a mean value is determined from these measurement data. Pressurized medium is transferred over a time duration from the pressurized medium store into the pressurized medium chamber during which time duration the pressure difference between the pressurized medium store and the mean value exceeds a threshold value.

According to still another feature of the invention, the vehicle body is suspended relative to at least one vehicle axle by two pressure chambers and a mean value of the pressure in the pressurized medium chambers is measured in that the pressurized medium chambers per axle are connected via valves to a pressure sensor. The valves are assigned to corresponding ones of the pressurized medium chambers. The pressurized medium is transferred over a time duration from the pressurized medium store into the pressurized medium chambers and, during this time span, the pressure difference between the pressurized medium store and the mean value exceeds a threshold value. This feature of the invention has the advantage compared to the feature discussed immediately above that the mean value in the two pressurized medium chambers is determined directly. A separate connection of the individual pressurized medium chambers to the pressure sensor is not necessary.

According to still another feature of the invention, the pressure determination in one or more of the pressurized medium chambers takes place directly in advance of a filling operation. The advantage of this embodiment is that the filling operation is carried out on the basis of a precise pressure value which was present in the pressurized medium chambers directly in advance of the filling operation. In this way, a computation of the initial pressurized medium pressure difference and of the time duration during which this pressurized medium pressure difference is exceeded can take place precisely. A further advantage of the embodiment becomes understandable when one considers that, to determine the pressure or the pressure mean value, one or more of the pressure chambers are connected simultaneously to a pressure sensor by opening the valves assigned thereto. After determining the pressure or the pressure mean value, the above-mentioned valves remain open and a valve, which is assigned to the pressurized medium store, is additionally opened in order to connect this valve to the one or more pressurized medium chambers. According to this embodiment, the advantage is therefore achieved that no additional switching operations at the valves (which shorten their service life) are necessary notwithstanding the determination of the pressure or of the pressure mean value in one or more pressure chambers when the pressurized medium chambers are connected to the pressurized medium store for filling directly after the determination.

According to another feature of the invention, the compressor is not operatively connected to the pressurized medium store during the time span in which the pressurized medium is transferred into a pressurized medium chamber via the compressor. The advantage of this embodiment is that the compressor transfers pressurized medium only into the pressurized medium chambers during the filling operation and not additionally into the pressurized medium store. In this way, the filling operation of one or more pressurized medium chambers is not delayed by an unwanted filling of the pressurized medium store.

According to another embodiment of the invention, pressurized medium is transferred by means of the compressor into the pressurized medium chamber during the time span in which the pressurized means is transferred from the pressurized medium store into a pressurized medium chamber. The advantage of this embodiment is that a filling operation of one or more pressurized medium chambers can be completed especially rapidly. Preferably, use is made of this further embodiment when the speed of the vehicle exceeds a threshold value because, in this case, the noise generated by the running of the compressor is not disturbing.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
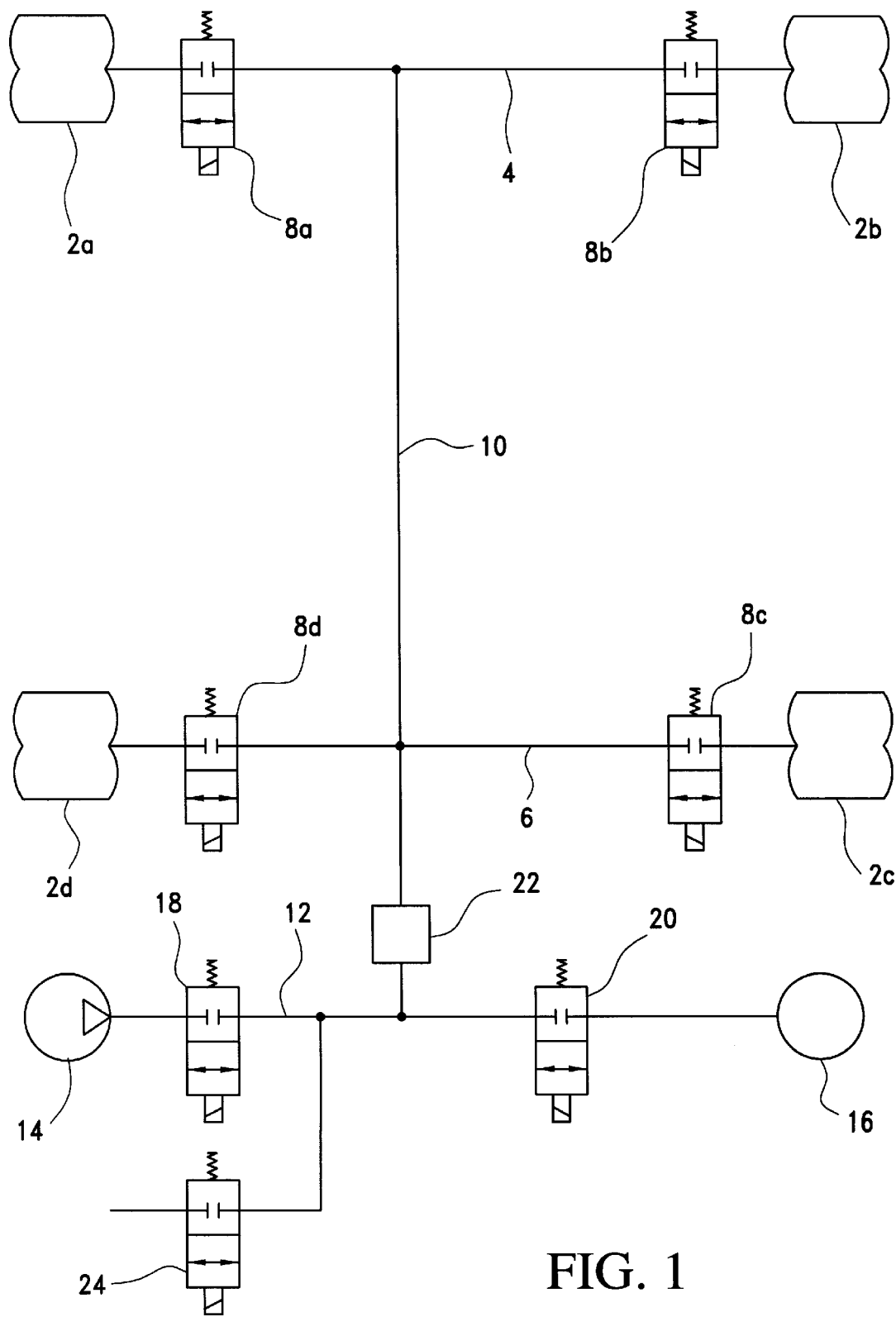
FIG. 1 is a schematic of a level control system with which the method according to the invention is carried out; and, FIG. 2 is a curve of the pressure difference (dp) plotted as a function of time (t).

FIG. 1 shows a level control system in the form of an air spring system for a motor vehicle. Level control systems of this kind are known per se so that the system shown in FIG. 1 will now be only briefly described.

The air spring system includes air springs 2a and 2b which are assigned to the forward axle of the motor vehicle and air springs 2c and 2d which are assigned to the rear axle of the vehicle. A vehicle body (not shown) of the motor vehicle is suspended by the air springs 2a to 2d. The air springs 2a and 2b are connected to each other via a transverse line 4 and the air springs 2c and 2d are connected to each other via a transverse line 6. The transverse line 4 contains two transverse check valves (8a, 8b) and these two check valves are assigned to corresponding ones of the air springs (2a, 2b). Transverse line 6 contains two transverse check valves (8c, 8d) which are assigned to corresponding ones of the air springs (2c, 2d). Furthermore, the transverse lines 4 and 6 are connected to a further line 10 via which the air springs 2a to 2d can be filled with pressurized air (pressurized medium) or via which the pressurized air can be discharged from the air springs 2a to 2d. The line 10 ends in a transverse line 12 having a first end connected via a valve 18 to a compressor 14 and having a second end connected via a valve 20 to a pressurized medium store in the form of a pressurized air store 16. Furthermore, a pressure sensor 22 is mounted in the line 10. With the aid of this sensor, the pressure in the air springs 2a to 2d and in the pressurized air store 16 can be measured. Finally, the line 10 can be connected via a valve 24 to the atmosphere so that air can be released from the air springs 2a to 2d in a manner known per se.

In the following, it will be explained with respect to air spring 2a how the air pressure in the air springs 2a to 2d can be measured with the aid of the pressure sensor 22. First, current is applied to the control input of the transverse check valve 8a by the control unit (not shown) of the air spring system so that the transverse check valve is transferred from its base state shown in FIG. 1 into its switched state. All other valves remain in the base state shown in FIG. 1. The air spring 2a is then connected via the transverse line 4 and the line 10 to the pressure sensor 22. After a time span of 0.1 to 2 seconds, a static air pressure of the air spring 2a is present at the pressure sensor 22 so that the air pressure can be measured there. If the air spring 2a is not to be filled directly after a completed pressure measurement, then the control input of the transverse check valve 8a is no longer supplied with current so that this valve transfers again into its base state. Otherwise, the control input of the transverse check valve 8a continues to be supplied with current so that it remains in its switched state.

In the following, it will be explained with respect to air springs 2a and 2b how the mean value of the air pressure can be determined in the two air springs of the air spring system. A first possibility is that the air pressure in the air springs 2a and 2b is individually determined as explained above and the mean value of the individual pressure values is computed in the control unit of the air spring system. Alternatively, it is possible that the control unit simultaneously supplies current to the control inputs of the transverse valves 8a and 8b so that they are transferred from the base state shown in FIG. 1 into their switched state. The remaining valves remain in the base position shown in FIG. 1. The air springs 2a and 2b are then connected via the transverse line 4 and the line 10 to the pressure sensor 22 so that, after a short time span, the mean air pressure in the air springs 2a and 2b settles and can be measured by the pressure sensor 22. When, after a completed pressure measurement, the air springs 8a and 8b are not to be filled, then the current supply to the control inputs of the transverse control valves 8a and 8b is interrupted so that they transfer again into the base state. Otherwise, the control inputs of the transverse check valves 8a and 8b continue to be supplied with current so that they remain in their switched state.

With the aid of the pressure sensor 22, the static air pressure in the pressurized air store 16 can likewise be measured in that the control input of the valve 20 is supplied with current by the control unit so that the valve 20 transfers from the base position shown in FIG. 1 into the switched positions The remaining valves of the air spring system remain in the base state shown in FIG. 1. After a short time span of approximately 0.1 to 2 seconds, the static air pressure in the pressurized air store 16 settles at the pressure sensor 22 so that this static air pressure can be measured by means of the sensor 22. After the pressure measurement is completed, the control input of the valve 20 is no longer supplied with current so that this valve can transfer into the base state.

The pressure values, which are measured by the pressure sensor 22, are transmitted to the control unit of the air spring system and are there evaluated. Based on the supply of current to the valves, the control unit recognizes where the pressure has been measured by the pressure sensor 22. If, for example, the transverse check valve 8a is supplied with current by the control unit and if then a measurement value is transmitted by the pressure sensor 22, then the control unit knows that this measurement value belongs to the air spring 2a.

It will now be explained with respect to air spring 2a how an air spring 2a to 2d of the air spring system can be filled with pressurized air. Directly in advance of filling the air spring 2a, and as explained above, the air pressure ps in the air pressure store 16 and the air pressure $p_L$ in the air spring 2a is measured with the aid of the pressure sensor 22. Thereafter, the initial pressure difference $dp_0 = p_s - p_L$ between the pressurized air store 16 and the air spring 2a is determined in the control unit of the air spring system. If the pressure difference $dp_0$ is above a positive threshold value, that is, the air pressure in the air pressure store 16 is greater than in the air spring 2a, then the air spring 2a is first connected to the pressurized air store 16. This takes place in that the control unit supplies current to the control input of the valve 20 so that this valve transfers from the base state shown in FIG. 1 into its switched state. The control input of the transverse check valve 8a had been supplied with current by the control unit for determining the air pressure in the air spring 2a and continues to be supplied with current during the computation of the pressure difference $dp_0$. For this reason, the transverse check valve 8a is likewise in its switched position. Then, pressurized air can flow from the pressurized air store 16 via the transverse line 12, the line 10 and the transverse line 4 into the air spring 2a. With the flow of the pressurized air from the pressurized air store 16 into the air spring 2a, the pressure $p_s$ comes ever closer to $p_L$ so that the pressure difference dp approaches the threshold value. Over the time duration during which the pressure difference lies above the threshold value, pressurized air is transferred from the pressurized air store 16 into the air spring 2a. How the time duration can be determined will be explained in connection with FIG. 2.

When the control unit determines that the time duration has elapsed (the pressure difference dp has therefore reached the threshold value), the control input of the valve 20 is no longer supplied with current by the control unit so that this valve transfers from its switched state into the base state shown in FIG. 1. If a further filling of the air spring 2a is necessary (because the vehicle body has not yet reached the desired level), the control input of valve 18 is supplied with current by the control unit so that the compressor 14 is connected via the transverse line 12, the line 10 and the transverse line 4 to the air spring 2a. Furthermore, the compressor 14 is driven by the control unit so that the compressor pumps pressurized air into the air spring 2a until the filling operation is completed, that is, the vehicle body has reached the desired level in the region of the air spring 2a. When this is the case, the control inputs of the valves 8a and 18 are no longer supplied with current by the control unit so that the valves 8a and 18 can transfer again from their switched state into the base state shown in FIG. 1.

The filling operation of the air spring 2a can be accelerated in that the air spring is simultaneously filled with the aid of the compressor 14 during the time span in which the air spring is filled from the pressurized air store 16. In this case, in addition to the control inputs of the valves 8a and 20, the control input of the valve 18 is supplied with current and a signal is transmitted to the compressor 14 so that the compressor pumps pressurized air into the air spring 2a.

The pressure measurement of the air pressure in the pressurized air store 16 (which pressure measurement is necessary in advance of the filling operation for the determination of the initial pressurized medium pressure difference) can take place directly after a change of the air pressure there. To reduce the number of valve switchings, and when reaching the desired level by utilizing the pressure store, the transverse check valves of the air springs are first closed while the storage valve 20 still remains open for subsequent pressure measurement. The storage valve 20 is only closed after determining the store pressure. For this case, no additional valve switching operation is therefore necessary. In the pressurized air store 16, the air pressure changes because of a filling of an air spring with pressurized air from the pressurized air store 16 or when pressurized air is transferred by means of the compressor 14 into the pressurized air store 16. The air pressure in the pressurized air store 16, which is measured after a pressure change, is stored in the control unit of the level control system. The determination of the air pressure, which is additionally necessary in advance of a filling operation, in one or several air springs, takes place, in contrast, preferably directly in advance of the filling operation.

If instead of filling a single one of the air springs 2a to 2d, two air springs of the air spring system are to be filled simultaneously, for example, the air springs 2a and 2b, the procedure is essentially as described above. One difference is that, for the computation of the pressurized medium pressure difference, the basis is the mean value of the pressure in both air springs (that is, $dp_0 = P_s - P_M$; $P_M$=mean value) instead of the pressure value in only one of the air springs. A further difference is that the two air springs (2a, 2b) are simultaneously connected to the pressurized air store 16 and/or to the compressor 14 via the corresponding transverse check valves (8a, 8b)

Figure 2:
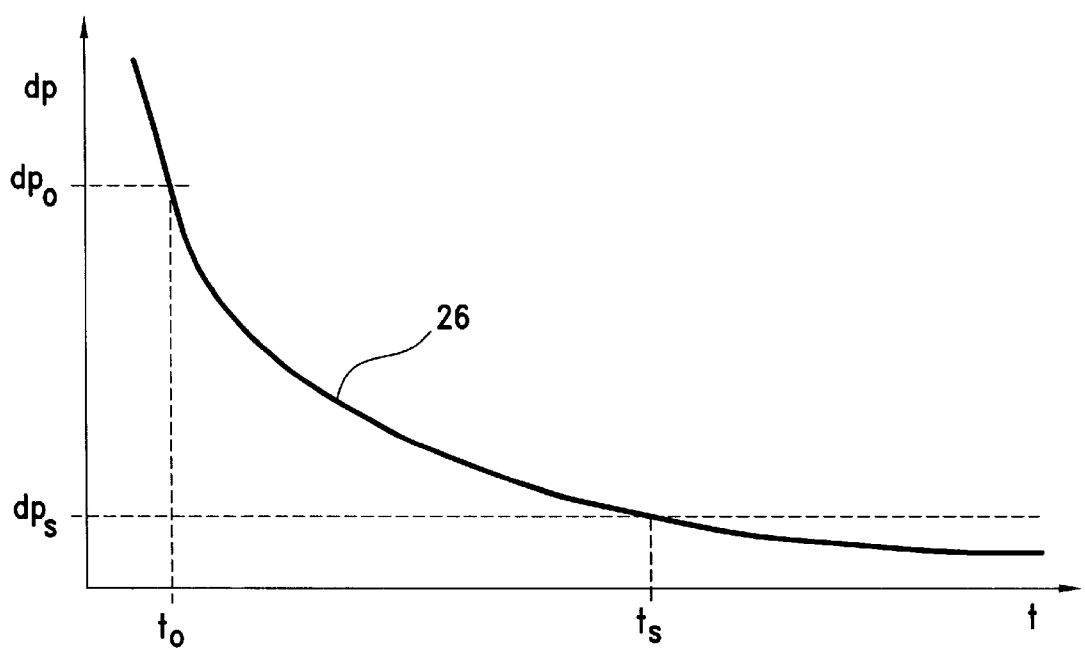

FIG. 2 shows a diagram wherein the pressure difference dp is plotted as a function of time (t). The diagram includes a characteristic line 26 which defines the time-dependent trace of the pressure difference dp. The characteristic line 26 is stored in the control unit of the air spring system. With the aid of the characteristic line 26, the time duration is computed in the control unit during which the pressure difference dp between the pressurized air store 16 and an air spring exceeds a threshold value. For this purpose, the initial pressure difference $dp_0$ is first determined by the control unit which pressure difference is present between the pressurized air store 16 and the air spring 2a to 2d which is to be filled. Thereafter, a determination is made from the characteristic line 26 in the control unit as to which time to is assigned to this pressure difference $dp_0$. The pressure difference $dp_0$, which is initially present in advance of the filling operation, decreases because of the pressure equalization between the pressurized air store 16 and the one air spring 2a to 2d which is to be filled, in accordance with the characteristic line 26. At time point $t_s$, the pressure difference $dp_0$ has dropped to a threshold value $dp_s$. From the diagram of FIG. 2, the time duration $T = t_s - t_0$ is computed in the control unit during which time the pressurized medium pressure difference dp between the pressurized air store 16 and the one air spring 2a to 2d, which is to be filled, exceeds the threshold value $dp_s$. The time duration T determined in this manner is used in the method for filling the air springs 2a to 2d in the manner explained in connection with FIG. 1.

In a corresponding way, the time duration can be determined when two air springs of the air spring system are to be filled simultaneously. The single difference is that the pressurized medium pressure difference is formed between the air pressure in the pressurized medium store 16 and the mean value in the air springs (changed characteristic field).

For carrying out the method of the invention, the pressurized medium pressure in the pressurized medium chamber(s), which is (are) to be filled, and the pressurized medium pressure in the pressurized medium store are measured exclusively in advance of the filling operation. The initial pressure difference $dp_0$ is determined from the measured pressurized medium pressure. A measurement of the pressurized medium pressure in the above-mentioned components is not carried out during a filling operation. Rather, a further monitoring of the pressurized medium pressure difference and a determination of the time duration T takes place from the characteristic line 26. A pressurized medium pressure measurement is no longer necessary for this purpose.

It is understood that the foregoing description is that of the preferred embodiments of the invention and that various changes and modifications may be made thereto without departing from the spirit and scope of the invention as defined in the appended claims.

What is claimed is:

1. A method for filling a pressurized medium chamber of a level control system for a motor vehicle by which a vehicle body is suspended relative to at least one axle of the vehicle, the level control system including: a pressurized medium store; at least one pressurized medium chamber which is operatively connected from time to time to the pressurized medium store so that pressurized medium from the pressurized medium store is transferrable into the pressurized medium chamber; and, a compressor which is operatively connected from time to time to the pressurized medium store or to the pressurized medium chamber in such a manner that pressurized medium is transferrable into the pressurized medium store or into the pressurized medium chamber by means of the compressor; the method comprising the steps of:

in advance of filling said pressurized medium chamber with the pressurized medium, determining the pressure in said pressurized medium store and the pressure in the pressurized medium chamber and the pressure difference between the pressurized medium store and the pressurized medium chamber; and, during the filling operation, transferring pressurized medium at least from said pressurized medium store to said pressurized medium chamber during a time span during which the pressure difference between said pressurized medium store and said pressurized medium chamber exceeds a threshold value;

transferring pressurized medium into said pressurized medium chamber utilizing said compressor when the pressurized medium pressure difference between said pressurized medium store and said pressurized medium chamber drops below said threshold value and a further filling of said pressurized medium chamber is necessary.

2. The method of claim 1, comprising the further step of determining said time span from a characteristic line which reflects the time-dependent course of said pressure difference.

3. The method of claim 1, comprising the further step of: measuring the pressure in said pressurized medium store directly after a change of the pressure therein.

4. The method of claim 1, comprising the further step of measuring the pressure in said pressurized medium store at regular intervals.

5. The method of claim 1, wherein said vehicle body is suspended relative to said at least one vehicle axle by at least two of said pressurized medium chambers, comprising the further steps of:

for filling said pressurized medium chambers in a common filling operation, measuring the pressure in each of said pressurized medium chambers in advance of said filling operation to obtain measurement values;

determining the mean value from said measurement values; and, transferring pressurized medium from said pressurized medium store into said pressurized medium chambers during a time span during which the pressure difference between said pressurized medium store and said mean value exceeds a threshold value.

6. The method of claim 1, wherein said vehicle body is suspended relative to said at least one vehicle axle by at least two of said pressurized medium chambers and said level control system further including valves corresponding to respective ones of said pressurized medium chambers and a pressure sensor, comprising the further steps of:

measuring a mean value of the pressure in said pressurized medium chambers by simultaneously connecting said pressurized medium chambers to said pressure sensor via said valves; and, transferring pressurized medium from said pressurized medium store into said pressurized medium chambers over a time span during which the pressure difference between said pressurized medium store and said mean value exceeds a threshold value.

7. The method of claim 1, comprising the further step of determining the pressure in said pressurized medium chamber directly in advance of a filling operation.

8. The method of claim 1, wherein said compressor is not operatively connected to said pressurized medium store during the time span in which pressurized medium is transferred by said compressor into said pressurized medium chamber.

9. The method of claim 1, comprising the further step of transferring additional pressurized medium into said pressurized medium chamber utilizing said compressor during the time span in which pressurized medium is transferred from said pressurized medium store into said pressurized medium chamber.

* * * * *